(12) United States Patent
Kurimura et al.

(10) Patent No.: US 7,988,811 B2
(45) Date of Patent: *Aug. 2, 2011

(54) ADHESIVE COMPOSITION AND METHOD FOR TEMPORARILY FIXING MEMBER BY USING THE SAME

(75) Inventors: Hiroyuki Kurimura, Shibukawa (JP); Tomoyuki Kanai, Shibukawa (JP); Kazuhiro Oshima, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 12/374,603

(22) PCT Filed: Jun. 28, 2007

(86) PCT No.: PCT/JP2007/063035
§ 371 (c)(1),
(2), (4) Date: Jan. 21, 2009

(87) PCT Pub. No.: WO2008/018252
PCT Pub. Date: Feb. 14, 2008

(65) Prior Publication Data
US 2010/0000670 A1    Jan. 7, 2010

(30) Foreign Application Priority Data
Aug. 10, 2006 (JP) .................. 2006-218416

(51) Int. Cl.
*B32B 27/00* (2006.01)
*C08F 8/00* (2006.01)

(52) U.S. Cl. .......... 156/332; 522/153; 525/193
(58) Field of Classification Search .......... 156/332; 522/153; 525/193
See application file for complete search history.

(56) References Cited

U.S. PATENT DOCUMENTS

| 5,753,362 | A | 5/1998 | Kawase et al. | |
|---|---|---|---|---|
| 7,829,605 | B2 * | 11/2010 | Watanabe et al. | 522/120 |
| 2008/0149270 | A1 * | 6/2008 | Oshima et al. | 156/327 |
| 2010/0012263 | A1 * | 1/2010 | Oshima et al. | 156/247 |
| 2010/0212824 | A1 * | 8/2010 | Lionberger et al. | 156/275.5 |

FOREIGN PATENT DOCUMENTS

| JP | 6 116534 | 4/1994 |
|---|---|---|
| JP | 7 90028 | 4/1995 |
| JP | 7 330835 | 12/1995 |
| JP | 11 71553 | 3/1999 |
| JP | 2001 226641 | 8/2001 |
| JP | 2002-338900 | 11/2002 |
| JP | 2007 9131 | 1/2007 |
| WO | 2006 100788 | 9/2006 |

OTHER PUBLICATIONS

Office Action issued Dec. 29, 2010, in Korean Patent Application No. 10-2008-7030179 (with Japanese and English translation).

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

To provide a method for temporarily fixing an optical member suitable for processing of optical members, and an adhesive composition useful for such a method.
An adhesive composition comprising (A) a polyfunctional (meth)acrylate, (B) a monofunctional (meth)acrylate and (C) a photopolymerization initiator, wherein the glass transition temperature of a cured resin obtained from the adhesive composition is from −50° C. to 40° C. A method for temporary fixing a member, which comprises bonding and temporarily fixing the member by means of the above adhesive composition, processing the temporarily fixed member, and immersing the processed is member in warm water of at most 90° C., thereby to remove a cured resin of the adhesive composition from the member.

9 Claims, No Drawings

ADHESIVE COMPOSITION AND METHOD FOR TEMPORARILY FIXING MEMBER BY USING THE SAME

TECHNICAL FIELD

The present invention relates to a method for temporarily fixing a member in processing of various members, and an adhesive composition for temporary fixation suitable for the fixation. More particularly, the present invention relates to a method for temporarily fixing an optical member in processing the member, and a photocurable adhesive composition suitable for the method.

BACKGROUND ART

Two-sided tapes and hot-melt type adhesives are used as adhesives for temporary fixation of optical lenses, prisms, arrays, silicon wafers, semiconductor packaging parts, and so on, and members bonded or laminated with use of these adhesives are cut into a predetermined shape, followed by removal of the adhesive to produce processed members. With respect to the semiconductor packaging parts, for example, they are fixed on a substrate with a two-sided tape and then cut into desired parts, and the two-sided tape is irradiated with ultraviolet rays to be separated from the parts. Furthermore, in the case of the hot-melt type adhesive, members are bonded therewith and heated to let the adhesive penetrate into their interspace, and then the members are cut into desired parts, followed by removal of the adhesive in an organic solvent.

However, in the case of the two-sided tape, there were problems that it was difficult to achieve satisfactory thickness accuracy; its adhesive strength was weak, so that in processing the parts, it is inferior in the chipping property; that it was impossible to separate the tape without heating at 100° C. or more; and that, where it was separated by irradiation with ultraviolet rays, it was impossible to separate the tape if an adherend had a poor UV transmittance.

In the case of the hot-melt type adhesive, it could not be effective in bonding without heating at 100° C. or more, so that there was a restriction on the members to be used. Furthermore, it was necessary to use an organic solvent in removal of the adhesive, and washing steps with an alkali solution and a halogen type organic solvent were cumbersome and also problematic from the viewpoint of working environments.

In order to overcome these drawbacks, photocurable or heat-curable adhesives for temporary fixation were proposed which contain a water-soluble compound such as a water-soluble vinyl monomer. These adhesives solved the problem of the removability in water, but they still had problems that the adhesive strength was low in fixation of parts and that the members after being cut had poor dimensional accuracy. Furthermore, adhesives for temporary fixation were proposed which had adhesion improved with use of a specific, highly hydrophilic (meth)acrylate, and also had removability improved by swelling and partial dissolution. However, a cutting process involves generation of frictional heat between the parts and a cutting jig such as a blade or a diamond cutter and thus is carried out while cooling the parts with a large amount of water. Therefore, a cured resin of the above highly hydrophilic composition swells to become soft during the cutting, whereby higher dimensional accuracy cannot be achieved. In addition, is the cured resin dissolved in part remains as an adhesive residual on the members after the removal, which causes a problem in appearance (Patent Documents 1, 2 and 3).

Patent Document 1: JP-A-06-116534
Patent Document 2: JP-A-11-71553
Patent Document 3: JP-A-2001-226641

DISCLOSURE OF THE INVENTION

Object to be Accomplished by the Invention

In order to improve the dimensional accuracy of the members after cutting, a photocurable adhesive composition for temporary fixation is desired, which is hydrophobic, high in adhesive strength, excellent in removability in water, free of an adhesive residue on the members after removal, and environmentally excellent in working.

The object of the present invention is to provide an adhesive composition having such properties and a method for temporarily fixing a member using it.

Means to Accomplish the Object

The present inventors have conducted extensive studies to solve the above problems of prior art and as a result, found that the above object of the present invention is accomplished by an adhesive composition which is a composition having a specific composition comprising specific hydrophobic (meth)acrylate monomers in combination, wherein the glass transition temperature of a cured resin obtained from the adhesive composition is from −50° C. to 40° C., and which has high adhesive strength and has favorable releasability in warm water. Further, the present inventors have found that by adding a granular material which is insoluble in the specific hydrophobic (meth)acrylic monomers to the adhesive composition, the releasability of the adhesive composition in warm water will be more favorable, and the object of the present invention is more favorably achieved.

The present invention is based on the above novel discoveries and provides the following.

(1) An adhesive composition comprising (A) a polyfunctional (meth)acrylate, (B) a monofunctional (meth)acrylate and (C) a photopolymerization initiator, wherein the glass transition temperature of a cured resin obtained from the adhesive composition is from −50° C. to 40° C.

(2) The adhesive composition according to the above (1), wherein both (A) and (B) are hydrophobic.

(3) The adhesive composition according to the above (1) or (2), which contains (A) and (B) in a ratio of (A):(B) of 5:95 to 95:5 (parts by mass) and contains (C) in an amount of from 0.1 to 20 parts by mass per 100 parts by mass of the total amount of (A) and (B).

(4) The adhesive composition according to any one of the above (1) to (3), which contains (D) a granular material which is insoluble in any of (A), (B) and (C) in an amount of from 0.1 to 20 parts by mass per 100 parts by mass of the total amount of (A) and (B).

(5) The adhesive composition according to the above (4), wherein the specific gravity of (D) is equal to or smaller than the specific gravity of the adhesive composition.

(6) The adhesive composition according to the above (4) or (5), wherein (D) is spherical.

(7) The adhesive composition according to any one of the above (4) to (6), wherein (D) is any one of crosslinked polymethyl methacrylate particles, crosslinked polystyrene particles and crosslinked polymethyl methacrylate/polystyrene copolymer particles, or a mixture of some or all of them.

(8) The adhesive composition according to any one of the above (4) to (7), wherein the average particle size of (D) by a laser method is from 20 to 200 μm.

(9) The adhesive composition according to any one of the above (4) to (8), wherein the standard deviation of the particle volume distribution relative to the particle size when the particle size (μm) of (D) by a laser method is represented by logarithm, is within a range of from 0.0001 to 0.25.

(10) A structure having a member bonded and fixed by means of the adhesive composition as defined in any one of the above (1) to (9).

(11) A method for temporarily fixing a member, which comprises bonding and temporarily fixing the member by means of the adhesive composition as defined in any one of the above (1) to (9), processing the temporarily fixed member, and immersing the processed member in warm water of at most 90° C., thereby to remove a cured resin of the adhesive composition from the member.

Effect of the Invention

The adhesive composition of the present invention is photocurable by virtue of its composition and is cured with visible light or ultraviolet rays. Therefore, the composition of the present invention is considerably superior in labor saving, energy saving and work reduction to the conventional hot-melt type adhesives. Furthermore, the cured resin of the composition shows a high adhesive strength without being affected by cutting water or the like used in processing, and thus displacement is unlikely to occur during processing of a member and it is thus easy to obtain a member excellent in dimensional accuracy. Furthermore, the cured resin has a feature of losing the adhesive strength through contact with warm water of at most 90° C., whereby the bonding strength between members or between a member and a jig, will be reduced to facilitate recovery of the member. As compared with the conventional adhesive compositions for temporary fixation, such a problem is solved that it is necessary to use an organic solvent which is expensive, is highly combustible or generates a gas harmful to human bodies. Furthermore, in the case of the adhesive composition within a specific preferred composition range of the present invention, the cured resin swells through contact with warm water of at most 90° C., and is recovered in the form of a film from the member, thereby providing an effect of excellent workability.

Since the temporary fixation method of the member according to the present invention uses the adhesive composition for temporary fixation losing the adhesive strength through contact with warm water of at most 90° C., as described above, it is possible to recover the member simply through contact with warm water. The problems of the conventional adhesive composition for temporary fixation are dissolved that it is necessary to use an organic solvent which is expensive, is highly combustible or generates a gas harmful to human bodies.

BEST MODE FOR CARRYING OUT THE INVENTION

The polyfunctional (meth)acrylate (A) to be used in the present invention may be a polyfunctional (meth)acrylate oligomer/polymer having two or more (meth)acryloyl groups at terminals or in side chains of the oligomer/polymer, or a polyfunctional (meth)acrylate monomer having two or more (meth)acryloyl groups. The polyfunctional (meth)acrylate oligomer/polymer may, for example, be 1,2-polybutadiene-terminated urethane (meth)acrylate (e.g. TE-2000 or TEA-1000, manufactured by NIPPON SODA CO., LTD.), its hydrogenated product (e.g. TEAI-1000, manufactured by NIPPON SODA CO., LTD.), 1,4-polybutadiene-terminated urethane (meth)acrylate (BAC-45, manufactured by OSAKA ORGANIC CHEMICAL INDUSTRY LTD.), polyisoprene-terminated (meth)acrylate, polyester urethane (meth)acrylate (e.g. UV-2000B, UV-3000B or UV-7000B manufactured by The Nippon Synthetic Chemical Industry Co., Ltd., KHP-11 or KHP-17 manufactured by Negami Chemical Industrial Co., Ltd.), polyether urethane (meth)acrylate (e.g. UV-3700B or UV-6011B manufactured by The Nippon Synthetic Chemical Industry Co., Ltd.) or bis A type epoxy (meth)acrylate.

A bifunctional (meth)acrylate monomer may, for example, be 1,3-butylene glycol di(meth)acrylate, 1,4-butanediol di(meth)acrylate, 1,6-hexadiol di(meth)acrylate, 1,9-nonanediol di(meth)acrylate, neopentyl glycol di(meth)acrylate, dicyclopentanyl di(meth)acrylate, 2-ethyl-2-butyl-propanediol(meth)acrylate, neopentyl glycol-modified trimethylol propane di(meth)acrylate, stearic acid-modified pentaerythritol diacrylate, polypropylene glycol di(meth)acrylate, 2,2-bis(4-(meth)acryloxy diethoxyphenyl)propane, 2,2-bis(4-(meth)acryloxy propoxyphenyl)propane or 2,2-bis(4-(meth)acryloxy tetraethoxyphenyl)propane.

A trifunctional (meth)acrylate monomer may, for example, be trimethylolpropane tri(meth)acrylate or tris[(meth)acryloxyethyl]isocyanurate.

A tetrafunctional or higher-functional (meth)acrylate monomer may, for example, be dimethylolpropane tetra(meth)acrylate, pentaerythritol tetra(meth)acrylate, pentaerythritolethoxy tetra(meth)acrylate, dipentaerythritol penta(meth)acrylate or dipentaerythritol hexa(meth)acrylate.

The polyfunctional (meth)acrylate (A) is more preferably hydrophobic. If it is water-soluble, the cured resin of the composition may swell during cutting, to cause displacement and degrade machining accuracy, such being undesirable. However, it may be hydrophilic unless the cured resin of the composition significantly swells or dissolves in part with water. In the present specification, hydrophobicity means a property to be not or hardly dissolved in water.

The content of the polyfunctional (meth)acrylate (A) is preferably such that (A):(B) is from 5:95 to 95:5 (parts by mass). That is, it is preferably from 1 to 50 parts by mass, per 100 parts by mass of the total amount of (A) and (B). If it is at least 1 part by mass, the removable nature of the cured resin of the composition from the adherend (hereinafter referred to simply as "the removability") will be sufficiently improved when the cured resin is immersed in warm water, and the cured resin of the composition can certainly be removed in the form of a film. On the other hand, when the content is at most 50 parts by mass, the initial adhesion can be maintained without deterioration. The content of the polyfunctional (meth)acrylate (A) is more preferably from 20 to 60 parts by mass per 100 parts by mass of the total amount of (A) and (B).

The monofunctional (meth)acrylate monomer (B) may, for example, be methyl (meth)acrylate, ethyl (meth)acrylate, propyl (meth)acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, dicyclopentenyloxyethyl (meth)acrylate, isobornyl (meth)acrylate, methoxylated cyclodecatriene (meth)acrylate, 2-hydroxyethyl (meth)acrylate, 2-hydroxypropyl (meth)acrylate, 3-hydroxypropyl (meth)acrylate, 4-hydroxybutyl (meth)acrylate, tetrahydrofurfuryl (meth)acrylate, 2-hydroxy-3-phenoxypropyl (meth)acrylate, glycidyl (meth)acrylate, caprolactone-modified tetrahydrofurfuryl (meth)acrylate, 3-chloro-2-hydroxypropyl (meth)acrylate, N,N-dimethylaminoethyl (meth)acrylate, N,N-diethylaminoethyl (meth)acrylate, t-butylaminoethyl (meth)acrylate, ethoxycarbonylmethyl (meth)acrylate, phenol ethylene oxide-modified acrylate, phenol(2-mol ethylene oxide-modified) acrylate, phenol(4-mol ethylene oxide-modified) acrylate, paracumylphenol ethylene oxide-modified acrylate, nonylphenol ethylene oxide-modified acrylate, nonylphenol (4-mol ethylene oxide-modified) acrylate, nonylphenol (8-mol ethylene oxide-modified) acrylate, nonylphenol (2.5-mol propylene oxide-modified) acrylate, 2-ethylhexyl carbitol acrylate, ethylene oxide-modified phthalic acid (meth)acrylate, ethylene oxide-modified succinic acid (meth)acrylate, trifluoroethyl (meth)acrylate, acrylic acid, methacrylic acid, maleic acid, fumaric acid, ω-carboxy-polycaprolactone mono(meth)acrylate, phthalic acid monohydroxyethyl (meth)acrylate, (meth)acrylic acid dimer, β-(meth)acroyloxyethyl hydrogen succinate, n-(meth)acryloyloxyalkyl hexahydrophthalimide, 2-(1,2-cyclohexacarboxyimide)ethyl acrylate, ethoxydiethylene glycol diacrylate or benzyl methacrylate.

Like the above (A), the monofunctional (meth)acrylate (B) is more preferably hydrophobic. If it is water-soluble, the cured resin of the composition may swell during cutting, to cause displacement and degrade machining accuracy, such being undesirable. However, it can be hydrophilic unless the cured resin of the composition significantly swells or dissolves in part with water.

The content of the monofunctional (meth)acrylate (B) is preferably such that (A):(B) is 5:95 to 95:5 (parts by mass) as described above. That is, the content of (B) is preferably from 5 to 95 parts by mass, per 100 parts by mass of the total amount of (A) and (B). When it is at least 5 parts by mass, the initial adhesion can be maintained without deterioration, and when it is at most 95 parts by mass, the removability can be secured, and the cured resin of the composition can be removed in the form of a film. The content of the monofunctional (meth)acrylate (B) is preferably from 40 to 80 parts by mass per 100 parts by mass of the total amount of (A) and (B).

The adhesion to a metal surface can be further improved by use of, in combination with the above blend composition of (A) and (B), a phosphate having a vinyl group or a (meth)acryl group, such as (meth)acryloyloxyethyl acid phosphate, dibutyl 2-(meth)acryloyloxyethyl acid phosphate, dioctyl 2-(meth)acryloyloxyethyl phosphate, diphenyl 2-(meth)acryloyloxyethyl phosphate or (meth)acryloyloxyethyl polyethylene glycol acid phosphate.

The photopolymerization initiator (C) is incorporated in order to effect sensitization with active rays such as visible light or ultraviolet rays to enhance the photocuring property of the resin composition, and can be one of various known photopolymerization initiators. Specifically, it may, for example, be benzophenone or its derivative; benzyl or its derivative; anthraquinone or its derivative; benzoin; a benzoin derivative such as benzoin methyl ether, benzoin ethyl ether, benzoin propyl ether, benzoin isobutyl ether or benzyl dimethyl ketal; an acetophenone derivative such as diethoxyacetophenone, or 4-t-butyltrichloroacetophenone; 2-dimethylaminoethyl benzoate, p-dimethylaminoethyl benzoate, diphenyl disulfide, thioxanthone or its derivative; camphor quinone; a camphor quinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromo-ethyl ester, 7,7-dimethyl-2,3-dioxobicyclo[2.2.1]heptane-1-carboxy-2-methyl ester or 7,7-dimethyl-2,3-dioxobicyclo[2.2.1]heptane-1-carboxylic acid chloride; an α-aminoalkylphenone derivative such as 2-methyl-1-[4-(methylthio)phenyl]-2-morpholinopropan-1-one or 2-benzyl-2-dimethylamino-1-(4-morpholinophenyl)-butanone-1; or an acylphosphine oxide derivative such as benzoyldiphenylphosphine oxide, 2,4,6-trimethylbenzoyldiphenylphosphine oxide, benzoyldiethoxyphosphine oxide, 2,4,6-trimethylbenzoyldimethoxyphenylphosphine oxide or 2,4,6-trimethylbenzoyldiethoxyphenylphosphine oxide. The photopolymerization initiators can be used alone or in combination as a mixture of two or more of them.

The content of the photopolymerization initiator (C) is preferably from 0.1 to 20 parts by mass, more preferably from 0.5 to 10 parts by mass, per 100 parts by mass of the total amount of (A) and (B). When it is at least 0.1 part by mass, it is certainly possible to obtain the effect of promoting the curing, and when it is at most 20 parts by mass, a sufficient curing rate can be obtained. Addition of the component (C) in an amount of at least 1 part by mass is further preferred in that the composition becomes curable regardless of the light irradiation level, the crosslinking degree of the cured resin of the composition becomes higher, no displacement occurs during cutting, and the removability is improved.

In the present invention, it is essential that the glass transition temperature of a cured resin obtained from the adhesive composition is within a range of from $-50°$ C. to $40°$ C. When the glass transition temperature of the cured resin obtained from the adhesive composition is within this range, when a member is temporarily fixed by means of the above adhesive composition, the temporarily fixed member is processed and then the processed member is immersed in warm water of at most $90°$ C., the cured resin itself of the adhesive composition thermally expands significantly and as a result, reduction in the bonding area is attained and the adhesive strength decreases, whereby only the member can easily be recovered. If the glass transition temperature of the cured resin obtained from the resin composition is at most $-50°$ C., although the removability will improve, the temporarily fixed member is likely to slip when it is processed, thus deteriorating the dimensional accuracy. From the viewpoint of the releasability and the dimensional accuracy, the glass transition temperature of the cured resin obtained from the adhesive composition is more preferably from $-25°$ C. to $35°$ C., furthermore preferably from $-20°$ C. to $25°$ C., still more preferably from $0°$ C. to $20°$ C.

A method of measuring the glass transition temperature of a cured product obtained from the adhesive composition used in the present invention is not particularly limited, but the glass transition temperature is measured by a known method such as DSC (differential scanning calorimetry) or dynamic viscoelasticity spectrum, and preferably dynamic viscoelasticity spectrum is employed.

In the present invention, a granular material (D) which is insoluble in any of (A), (B) and (C) (hereinafter referred to as a granular material (D) or simply as (D)) may be used together with (A) to (C), whereby a certain thickness of the composition after curing can be maintained, thus improving machining accuracy. Further, a cured resin of the adhesive composition and the granular material (D) differ in the coefficient of linear expansion, and accordingly when a member is temporarily fixed by means of the adhesive composition, the temporarily fixed member is processed and then the processed member is immersed in warm water of at most $90°$ C., swollen or three-dimensional deformation will occur at the interface between the member and the cured resin of the adhesive composition and as a result, a decrease in the bonding area is attained and releasability will further improve.

The granular material (D) may be either organic particles or inorganic particles, which are commonly employed. Specifically, the organic particles may, for example, be polyethylene particles, polypropylene particles, crosslinked polymethyl methacrylate particles or crosslinked polystyrene particles. The inorganic particles may, for example, be ceramic particles such as glass, silica, alumina or titanium.

The specific gravity of the granular material (D) is preferably equal to or smaller than the specific gravity of the adhesive composition. If the specific gravity of (D) is greater than the specific gravity of the adhesive composition, the granular material tends to be precipitated in the adhesive composition and will not sufficiently be dispersed in the adhesive composition. When the specific gravity of the granular material is equal to or smaller than the specific gravity of the adhesive composition, the granular material will easily be dispersed in the adhesive composition, and the dimensional accuracy and the releasability when the temporarily fixed member is fixed will improve. When the specific gravity of the granular material is smaller than the specific gravity of the adhesive composition, the difference between the specific gravity of the granular material and the specific gravity of the adhesive composition is preferably within 1.5, particularly preferably within 0.01.

The granular material (D) is preferably spherical with a view to improving machining accuracy i.e. controlling of the film thickness of the adhesive. Specifically, the organic particles are preferably crosslinked polymethyl methacrylate particles, crosslinked polystyrene particles or crosslinked polymethyl methacrylate/polystyrene copolymer particles obtained as monodispersed particles by a known emulsion polymerization of a crosslinkable monomer with a methyl methacrylate monomer and/or a styrene monomer. As the inorganic particles, spherical silica is preferred, since they are substantially free from deformation of particles, and fluctuation of the film thickness of the composition after curing by fluctuation of the particle size tends to be small. Among them, more preferred are any one of crosslinked polymethyl methacrylate particles, crosslinked polystyrene particles and crosslinked polymethyl methacrylate/polystyrene copolymer particles, or a mixture thereof, from the viewpoint of the storage stability relating to e.g. sedimentation of particles, or the reactivity of the composition.

The average particle size of the granular material (D) by a laser method is preferably within a range of from 20 to 200 µm. If the average particle size of the granular material is less than 20 µm, the releasability will be poor, and if it is at least 200 µm, the temporarily fixed member is likely to slip when it is processed, thus deteriorating the dimensional accuracy. The average particle size is more preferably from 35 µm to 150 µm from the viewpoint of the releasability and the dimensional accuracy, more preferably from 50 µm to 120 µm. In the present invention, the particle size and the standard deviation of the particle size distribution are measured by laser diffraction type particle size distribution measuring apparatus SALD-2200 manufactured by Shimadzu Corporation.

Further, the standard deviation of the particle volume distribution relative to the particle size when the particle size (µm) of the granular material (D) by a laser method is represented by logarithm, is preferably within a range of from 0.0001 to 0.25. When the standard deviation of the particle size of the granular material is within this range, the fluctuation of the film thickness of the composition after curing by fluctuation of the particle size tends to be small, and the temporarily fixed member hardly slip when it is processed, whereby not only excellent dimensional accuracy is achieved but also removability will significantly improve. From the viewpoint of the dimensional accuracy and the releasability, the standard deviation of the particle size of the granular material is more preferably from 0.0001 to 0.15, furthermore preferably from 0.0001 to 0.1, still more preferably from 0.0001 to 0.08, particularly preferably from 0.0001 to 0.072.

The content of the granular material (D) is preferably from 0.1 to 20 parts by mass per 100 parts by mass of the total amount of (A) and (B) from the viewpoint of the adhesion strength, the machining accuracy and the releasability, more preferably from 0.2 to 10 parts by mass, furthermore preferably from 0.2 to 6 parts by mass.

In order to improve the storage stability, the adhesive composition of the present invention may contain a small amount of a polymerization inhibitor. The polymerization inhibitor may, for example, be methyl hydroquinone, hydroquinone, 2,2-methylene-bis(4-methyl-6-tertiary-butylphenol), catechol, hydroquinone monomethyl ether, monotertiary butylhydroquinone, 2,5-ditertiary butylhydroquinone, p-benzoquinone, 2,5-diphenyl-p-benzoquinone, 2,5-ditertiary-butyl-p-benzoquinone, picric acid, citric acid, phenothiazine, tertiary-butyl catechol, 2-butyl-4-hydroxy anisole or 2,6-ditertiary-butyl-p-cresol.

The amount of the polymerization inhibitor to be used is preferably from 0.001 to 3 parts by mass, more preferably from 0.01 to 2 parts by mass, per 100 parts by mass of the (meth)acrylate monomer. When the amount is at least 0.001 part by mass, the storage stability can be secured, and when it is at most 3 parts by mass, good adhesion can be obtained, and the composition can be prevented from being uncured.

In the present invention, a polar organic solvent may be used in combination. By use of a polar organic solvent in combination, a phenomenon can securely be developed that the cured composition is brought into contact with warm water and easily swells, thereby to decrease the adhesive strength.

Regarding the polar organic solvent, its boiling point is preferably at least 50° C. and at most 200° C., more preferably at least 55° C. and at most 100° C. It is more preferred to select a polar organic solvent having a boiling point within the above range, whereby a phenomenon will more securely be developed that the cured composition is brought into contact with warm water thereby to decrease the adhesive strength. Such a polar organic solvent may, for example, be an alcohol, a ketone or an ester, and according to studies by the present inventors, an alcohol is preferably selected.

The alcohol may, for example, be methanol, ethanol, n-propanol, isopropanol, n-butanol, isobutanol, secondary butanol, tertiary butanol, n-amyl alcohol, isoamyl alcohol or 2-ethylbutyl alcohol. Among the above alcohols, preferred are methanol, ethanol, n-propanol, isopropanol, n-butanol, isobutanol, secondary butanol and tertiary butanol each having a boiling point of at most 120° C., and among them, methanol, ethanol, isopropanol and n-butanol are more preferred.

The amount of the polar organic solvent added is preferably from 0.5 to 10 parts by mass, more preferably from 1 to 8 parts by mass per 100 parts by mass of the total amount of (A) and (B). If it is at least 0.5 part by mass, the releasability will be secured, and when it is at most 10 parts by mass, the initial adhesive will not decrease, and the cured resin of the composition will be separated in the form of a film.

The composition of the present invention may contain an additive, such as an elastomer of various type, e.g., acryl rubber, urethane rubber or acrylonitrile-butadiene-styrene rubber, an inorganic filler, a solvent, an extender, a reinforcing material, a plasticizer, a thickener, a dye, a pigment, a flame retardant, a silane coupling agent or a surfactant, within a range not to impair the object of the present invention.

Now, in the method for temporarily fixing a member by the present invention, a member is bonded by means of the adhesive composition of the present invention, the composition is cured and to temporarily fix the member, the temporarily fixed member is processed, and the processed member is immersed in warm water of at most 90° C. thereby to remove a cured resin of the adhesive composition from the member, whereby various members such as optical members can be processed with high machining accuracy without using an organic solvent.

According to a preferred embodiment of the present invention, at the time of removing the cured resin of the adhesive composition, the cured resin is brought into contact with warm water of at most 90° C. to swell and is removed in the form of a film from the member, whereby it is possible to obtain an effect of excellent working efficiency.

In the temporary fixation method of the present invention, by the use of an adhesive made of the adhesive composition of the present invention, it is possible to certainly obtain the above effect.

In the temporary fixation method of the present invention, by use of warm water appropriately heated, specifically warm water of at most 90° C., removal in water is achieved in a short period of time, thus improving the productivity. With respect to the temperature of the warm water, it is preferred to use warm water of from 30° C. to 90° C., more preferably from 40° C. to 90° C., because the cured resin of the adhesive will thermally expand in a short period of time and the residual stress in curing of the composition is released. Further, in a case where a member is bonded and temporarily fixed by means of the adhesive composition containing the granular material (D), when the temporarily fixed member is processed and the processed member is immersed in warm water of at most 90° C., by the difference in the coefficient of linear expansion between a cured resin of the adhesive composition and the granular material, swollen or three-dimensional deformation occurs on the interference between the member and the cured resin of the adhesive composition, and as a result, the decrease in the bonding area is attained, whereby the adhesive strength will decrease, and the cured resin of the adhesive will be removed in the form of a film, such being favorable. A recommendable method for bringing the cured resin into contact with water is a method of immersing the whole of the bonded member in water, which is simple.

In the present invention, there are no particular restrictions on the material of the member to be temporarily fixed, and in a case where the adhesive is an ultraviolet-curable adhesive, the member is preferably one made of a UV transmitting material. Examples of such material include crystalline quartz members, glass members and plastic members, and thus the temporary fixation method of the present invention can be applied to temporary fixation in processing of crystal oscillators, glass lenses, plastic lenses and optical disks.

In the temporary fixation method of the present invention, with respect to a method of using the adhesive, in a case where a photocurable adhesive is used as the adhesive, for example, a method of applying an appropriate amount of the adhesive onto a bonding surface of a member to be fixed or a support substrate, and then placing another member thereon, or a method of preliminarily stacking multiple members to be temporarily fixed, and letting the adhesive penetrate into their interspace, and thereafter irradiating the members with visible light or ultraviolet rays to cure the photocurable adhesive to temporarily fix the members, may be mentioned.

Thereafter, the temporarily fixed members are subjected to processing such as cutting, grinding, polishing or drilling into a desired shape, and then the members are immersed in water, preferably warm water, whereby the cured resin of the adhesive can be removed from the members.

Now, the present invention will be described in further detail with reference to Examples and Comparative Examples, but it should be understood that the present invention is by no means restricted by such Examples.

Example 1

As the polyfunctional (meth)acrylates (A), 30 parts by mass of "UV-3000B" manufactured by The Nippon Synthetic Chemical Industry Co., Ltd. (polyester urethane acrylate, hereinafter abbreviated as "UV-3000B") and 15 parts by mass of dicyclopentanyl diacrylate ("KAYARAD R-684" manufactured by Nippon Kayaku Co., Ltd., hereinafter abbreviated as "R-684"); as the monofunctional (meth)acrylates (B), 20 parts by mass of 2-(1,2-cyclohexacarboxyimide)ethyl acrylate ("ARONIX M-140" manufactured by TOAGOSEI CO., LTD., hereinafter abbreviated as "M-140") and 35 parts by mass of phenol 2 mol ethylene oxide-modified acrylate ("ARONIX M-101A" manufactured by TOAGOSEI CO., LTD., hereinafter abbreviated as "M-101A"); as the photopolymerization initiator (C), 1 part by mass of I-907:2-methyl-1-[4-(methylthio)phenyl]-2-molpholinopropan-1-one ("IRGACURE907" manufactured by Ciba Specialty Chemicals, hereinafter abbreviated as "IRGACURE907" or simply as "I-907"); as the granular material (D), 1 part by mass of spherical crosslinked polystyrene particles with an average particle size of 100 μm, a standard deviation of the particle volume distribution relative to the particle size when the particle size (μm) is represented by logarithm of 0.063 and a specific gravity of 1.05 ("GS-100S" manufactured by GANZ CHEMICAL CO., LTD.); and as the polymerization inhibitor, 0.1 part by mass of MDP (2,2-methylene-bis(4-methyl-t-butylphenol, Sumilizer MDP-S manufactured by Sumitomo Chemical Co., Ltd.) were added to prepare a resin composition (adhesive composition). Using the obtained resin composition, the glass transition temperature, the tensile shear bond strength and the specific gravity of liquid were measured, and removing test was conducted by the following evaluation methods. The results are shown in Table 1. Further, the average particle size and the standard deviation of the particle volume distribution relative to the particle size when the particle size (μm) is represented by logarithm of the granular material (D) were measured.

Evaluation Methods

Glass transition temperature: The resin composition was sandwiched between PET films using a silicon sheet with a thickness of 1 mm as a frame and cured from the upper surface by using a curing apparatus using an electrodeless discharge lamp manufactured by Fusion UV Systems Inc. under a condition of an accumulated quantity of light of 2,000 mJ/cm$^2$ at a wavelength of 365 nm and further cured from the lower surface under a condition of an accumulated quantity of light of 2,000 mJ/cm$^2$ at a wavelength of 365 nm to prepare a cured resin of the resin composition with a thickness of 1 mm. The prepared cured resin was cut into a length of 50 mm and a width of 5 mm by a cutter to prepare a cured resin for glass transition temperature measurement. The obtained cured resin was heated at a heating rate of 2° C. per minute while applying a stress and distortion in the tensile direction at 1 Hz to the cured resin in a nitrogen atmosphere by a dynamic viscoelasticity measuring apparatus "DMS210" manufactured by Seiko Instruments & Electronics Ltd. to measure tan δ, and the temperature at the peak top of the tan δ was regarded as the glass transition temperature.

Tensile shear bond strength: Measured in accordance with JIS K6850. Specifically, heat resistant Pyrex (registered trademark, the same applies hereinafter) glass (25 mm×25 mm×2.0 mm) was used as an adherend. Two sheets of the heat resistant Pyrex glass were bonded in a bonding area with a diameter of 8 mm with the prepared resin composition. Then, the composition was cured by a curing apparatus using an electrodeless discharge lamp manufactured by Fusion UV Systems Inc. under a condition of an accumulated quantity of light of 2,000 mJ/cm² at a wavelength of 365 nm to prepare a test piece for tensile shear bond strength. The test piece thus prepared was subjected to measurement of tensile shear bond strength by means of a universal testing machine at a temperature of 23° C. under a humidity of 50% at a pulling rate of 10 mm/min.

Specific gravity of liquid: Measured in accordance with JIS Z8804 (methods of measuring specific gravity of liquid, 3. method of measuring specific gravity by specific gravity bottle).

Removing test: A test piece for a removing test was prepared by curing the resin composition prepared in the same manner as above except that the composition was applied to the above heat resistant Pyrex glass and the Pyrex glass was bonded to a blue sheet glass (150 mm×150 mm×1.7 mm in thickness) as a substrate. The test piece thus obtained was immersed in warm water (80° C.), whereby the period of time for removal of the heat resistant Pyrex glass was measured, and the removal state thereof was also observed.

Average particle size and standard deviation of particle volume distribution relative to particle size when particle size (μm) is represented by logarithm of granular material (D): Measured by a laser diffraction type particle size distribution measuring apparatus ("SALD-2200" manufactured by Shimadzu Corporation).

TABLE 1

| | | Ex. | | | | | | |
|---|---|---|---|---|---|---|---|---|
| | — | 1-1 | 1-2 | 2 | 3 | 4 | 5 | 6 |
| Component (A) (parts by mass) | UV-3000B | 30 | 30 | 30 | 30 | 20 | 20 | 20 |
| | UV-3700B | — | — | — | — | — | — | — |
| | UV-7000B | — | — | — | — | — | — | — |
| | 1.6-HX-A | — | — | — | — | 10 | 10 | 10 |
| | R-684 | 15 | 15 | 15 | 15 | — | — | — |
| Component (B) (parts by mass) | M-101A | 35 | 35 | 35 | 35 | 30 | 30 | 30 |
| | QM | — | — | — | — | — | — | — |
| | BZ | — | — | — | — | — | — | — |
| | M-140 | 20 | 20 | 20 | 20 | 40 | 40 | 40 |
| | EC-A | — | — | — | — | — | — | — |
| | IBX | — | — | — | — | — | — | — |
| Component (C) photopolymerization initiator (parts by mass) | BDK | — | 1 | 5 | 10 | 1 | 3 | 5 |
| | I-907 | 1 | — | — | — | — | — | — |
| Other components (parts by mass) | 2-HEMA | — | — | — | — | — | — | — |
| | N-vinyl-pyrrolidone | — | — | — | — | — | — | — |
| Polymerization inhibitor | MDP | 0.1 | 0.1 | 0.1 | 0.1 | 0.1 | 0.1 | 0.1 |
| Component (D): granular material insoluble in (A), (B) and (C) (composition) | | ***) | ***) | ***) | ***) | ***) | ***) | ***) |
| Component (D): granular material insoluble in (A), (B) and (C) (parts by mass) | | 1 | 1 | 1 | 1 | 1 | 1 | 1 |
| Specific gravity of component (D): granular material insoluble in (A), (B) and (C) | | 1.05 | 1.05 | 1.05 | 1.05 | 1.05 | 1.05 | 1.05 |
| Shape of component (D): granular material insoluble in (A), (B) and (C) | | Spherical | Spherical | Spherical | Spherical | Spherical | Spherical | Spherical |
| Average particle size (μm) of component (D): granular material insoluble in (A), (B) and (C) | | 100 | 100 | 100 | 100 | 100 | 100 | 100 |
| Standard deviation of particle size of component (D): granular material insoluble in (A), (B) and (C) | | 0.063 | 0.063 | 0.063 | 0.063 | 0.063 | 0.063 | 0.063 |
| Glass transition temperature (° C.) | | 13.2 | 11.2 | 7.1 | 5.5 | 17.2 | 12.4 | 11.8 |
| Bond strength (MPa) | | 12.1 | 12.1 | 11.9 | 10.8 | 11.5 | 13.7 | 12.1 |
| Specific gravity of liquid | | 1.16 | 1.16 | 1.16 | 1.16 | 1.16 | 1.16 | 1.16 |
| Time for removal in warm water at 80° C. (min. sec.) | | 3 min | 2 min | 1 min | 30 sec | 3 min | 30 sec | 15 sec |
| Removal state*)**) | | Film form | Film form | Film form | Film form | Film form | Film form | Film form |

| | | Ex. | | | | | |
|---|---|---|---|---|---|---|---|
| | — | 7 | 8 | 9 | 10 | 11 | 12 |
| Component (A) (parts by mass) | UV-3000B | — | — | — | — | — | — |
| | UV-3700B | — | 20 | 20 | 20 | 20 | 20 |
| | UV-7000B | 20 | — | — | — | — | — |
| | 1.6-HX-A | 10 | 10 | 10 | 10 | 10 | 10 |
| | R-684 | — | — | — | — | — | — |

TABLE 1-continued

| | | | | | | | |
|---|---|---|---|---|---|---|---|
| Component (B) (parts by mass) | M-101A | 25 | 30 | 10 | 15 | 20 | 25 |
| | QM | — | — | — | — | — | — |
| | BZ | — | — | — | — | — | — |
| | M-140 | 45 | 40 | 40 | 40 | 40 | 40 |
| | EC-A | — | — | 20 | 15 | 10 | 5 |
| | IBX | — | — | — | — | — | — |
| Component (C) photopolymerization initiator (parts by mass) | BDK | 3 | 3 | 3 | 3 | 3 | 1 |
| | I-907 | — | — | — | — | — | — |
| Other components (parts by mass) | 2-HEMA | — | — | — | — | — | — |
| | N-vinyl-pyrrolidone | — | — | — | — | — | — |
| Polymerization inhibitor | MDP | 0.1 | 0.1 | 0.1 | 0.1 | 0.1 | 0.1 |
| Component (D): granular material insoluble in (A), (B) and (C) (composition) | | ***) | ***) | ***) | ***) | ***) | ***) |
| Component (D): granular material insoluble in (A), (B) and (C) (parts by mass) | | 1 | 1 | 1 | 1 | 1 | 1 |
| Specific gravity of component (D): granular material insoluble in (A), (B) and (C) | | 1.05 | 1.05 | 1.05 | 1.05 | 1.05 | 1.05 |
| Shape of component (D): granular material insoluble in (A), (B) and (C) | | Spherical | Spherical | Spherical | Spherical | Spherical | Spherical |
| Average particle size (μm) of component (D): granular material insoluble in (A), (B) and (C) | | 100 | 100 | 100 | 100 | 100 | 100 |
| Standard deviation of particle size of component (D): granular material insoluble in (A), (B) and (C) | | 0.063 | 0.063 | 0.063 | 0.063 | 0.063 | 0.063 |
| Glass transition temperature (° C.) | | 24.5 | 10.8 | −36.2 | −24.1 | −18.3 | −5.2 |
| Bond strength (MPa) | | 13.2 | 11.8 | 13.1 | 12.2 | 10.9 | 11.8 |
| Specific gravity of liquid | | 1.11 | 1.13 | 1.13 | 1.13 | 1.13 | 1.13 |
| Time for removal in warm water at 80° C. (min. sec.) | | 20 min | 1 min | 45 min | 20 min | 10 min | 5 min |
| Removal state*)**) | | Film form | Film form | Film form | Film form | Film form | Film form |

*)Film form: The cured adhesive composition was removed in the form of a film from the glass surface with no adhesive residue.
**)Adhesive residue: The glass was removed, but the cured adhesive composition remained on the glass surface.
***)Crosslinked polystyrene particles Examples 2 to 12 and Comparative Examples 1 to 4

Resin compositions were prepared in the same manner as in Example 1 except that materials as identified in Tables 1 and 2 were used in compositions as identified in Tables 1 and 2. With respect to the obtained compositions, the glass transition temperature, the tensile shear bond strength and the specific gravity of liquid were measured and the removing test was carried out in the same manner as in Example 1. Further, the average particle size and the standard deviation of the particle volume distribution relative to the particle size when the particle size (μm) is represented by logarithm of the granular material (D) were measured. The results are shown in Tables 1 and 2.

TABLE 2

| | | Comp. Ex. | | | |
|---|---|---|---|---|---|
| — | | 1 | 2 | 3 | 4 |
| Component (A) (parts by mass) | UV-3700B | — | — | — | — |
| | UV-3700B | — | — | — | — |
| | UV-7000B | — | — | — | — |
| | 1.6-HX-A | — | — | — | — |
| | R-684 | — | 10 | — | — |
| Component (B) (parts by mass) | M-101A | — | — | — | — |
| | QM | — | — | — | — |
| | BZ | 50 | 40 | — | — |
| | M-140 | — | — | — | — |
| | EC-A | — | — | — | — |
| | IBX | 50 | 50 | 30 | — |
| Component (C) photopolymerization initiator (parts by mass) | BDK | 3 | 3 | 3 | 3 |
| | I-907 | — | — | — | — |
| Other components (parts by mass) | 2-HEMA | — | — | 70 | — |
| | N-vinyl-pyrrolidone | — | — | — | 100 |

TABLE 2-continued

|  | — | Comp. Ex. | | | |
|---|---|---|---|---|---|
|  |  | 1 | 2 | 3 | 4 |
| Polymerization inhibitor | MDP | 0.1 | 0.1 | 0.1 | 0.1 |
| Component (D): granular material insoluble in (A), (B) and (C) (composition) |  | — | — | — | — |
| Component (D): granular material insoluble in (A), (B) and (C) (parts by mass) |  | — | — | — | — |
| Specific gravity of component (D): granular material insoluble in (A), (B) and (C) |  | — | — | — | — |
| Shape of component (D): granular material insoluble in (A), (B) and (C) |  | — | — | — | — |
| Average particle size (μm) of component (D): granular material insoluble in (A), (B) and (C) |  | — | — | — | — |
| Standard deviation of particle size of component (D): granular material insoluble in (A), (B) and (C) |  | — | — | — | — |
| Glass transition temperature (° C.) |  | 115 | 110 | 93 | 54 |
| Bond strength (MPa) |  | 10.2 | 13.5 | 12.9 | 6.7 |
| Specific gravity of liquid |  | 1.11 | 1.12 | 1.13 | 1.22 |
| Time for removal in warm water at 80° C. (min. sec.) |  | Not removed | Not removed | Not removed | 185 min |
| Removal state*)**) |  | — | — | — | Adhesive residue |

*)Film form: The cured adhesive composition was removed in the form of a film from the glass surface with no adhesive residue.
**)Adhesive residue: The glass was removed, but the cured adhesive composition remained on the glass surface.

Examples 13 and 14 and 19 to 23

Resin compositions were prepared in the same manner as in Example 1 except that as the granular material (D), spherical crosslinked polystyrene particles ("SGP-150C" manufactured by Soken Chemical & Engineering Co., Ltd.) with an average particle size of 60 μm, a standard deviation of the particle volume distribution relative to the particle size when the particle size (μm) is represented by logarithm of 0.086 and a specific gravity of 1.05 were used and that materials as identified in Tables 3 and 4 were used in compositions as identified in Tables 3 and 4. With respect to the obtained compositions, the same measurements as in Example 1 were carried out. The results are shown in Tables 3 and 4.

TABLE 3

|  | — | Ex. | | | | | |
|---|---|---|---|---|---|---|---|
|  |  | 13 | 14 | 15 | 16 | 17 | 18 |
| Component (A) (parts by mass) | UV-3000B | — | — | — | 30 | 30 | 30 |
|  | UV-3700B | — | — | — | — | — | — |
|  | UV-7000B | 20 | 20 | 20 | — | — | — |
|  | 1.6-HX-A | — | — | — | — | — | — |
|  | R-684 | 15 | 15 | 15 | 15 | 15 | 15 |
| Component (B) (parts by mass) | M-101A | 25 | 25 | 25 | 35 | 35 | 35 |
|  | QM | — | — | — | — | — | — |
|  | BZ | — | — | — | — | — | — |
|  | M-140 | 40 | 40 | 40 | 20 | 20 | 20 |
|  | EC-A | — | — | — | — | — | — |
|  | IBX | — | — | — | — | — | — |
| Component (C) photopolymerization initiator (parts by mass) | BDK | 3 | 1 | 1 | 1 | 1 | 1 |
|  | I-907 | — | — | — | — | — | — |
| Other components (parts by mass) | 2-HEMA | — | — | — | — | — | — |
|  | N-vinyl-pyrrolidone | — | — | — | — | — | — |
| Polymerization inhibitor | MDP | 0.1 | 0.1 | 0.1 | 0.1 | 0.1 | 0.1 |
| Component (D): granular material insoluble in (A), (B) and (C) (composition) |  | ***) | ***) | ***) | ****) | ****) | ****) |
| Component (D): granular material insoluble in (A), (B) and (C) (parts by mass) |  | 1 | 1 | 2 | 1 | 1 | 1 |
| Specific gravity of component (D): granular material insoluble in (A), (B) and (C) |  | 1.05 | 1.05 | 1.05 | 1.14 | 1.14 | 1.14 |

TABLE 3-continued

|  | — | Ex. 13 | Ex. 14 | Ex. 15 | Ex. 16 | Ex. 17 | Ex. 18 |
| --- | --- | --- | --- | --- | --- | --- | --- |
| Shape of component (D): granular material insoluble in (A), (B) and (C) |  | Spherical | Spherical | Spherical | Spherical | Spherical | Spherical |
| Average particle size (μm) of component (D): granular material insoluble in (A), (B) and (C) |  | 60 | 60 | 58 | 140 | 70 | 40 |
| Standard deviation of particle size of component (D): granular material insoluble in (A), (B) and (C) |  | 0.086 | 0.086 | 0.078 | 0.074 | 0.073 | 0.071 |
| Glass transition temperature (° C.) |  | 34.5 | 39.2 | 39.2 | 11.2 | 11.2 | 11.2 |
| Bond strength (MPa) |  | 13.2 | 12.6 | 11.4 | 9.9 | 12.1 | 11.8 |
| Specific gravity of liquid |  | 1.11 | 1.11 | 1.11 | 1.16 | 1.16 | 1.16 |
| Time for removal in warm water at 80° C. (min. sec.) |  | 45 min | 80 min | 30 min | 2 min | 2 min | 5 min |
| Removal state*)**) |  | Film form | Film form | Film form | Film form | Film form | Film form |

*)Film form: The cured adhesive composition was removed in the form of a film from the glass surface with no adhesive residue.
**)Adhesive residue: The glass was removed, but the cured adhesive composition remained on the glass surface.
***)Crosslinked polystyrene particles
****)Crosslinked polymethyl methacrylate particles

TABLE 4

|  |  | Ex. 19 | Ex. 20 | Ex. 21 | Ex. 22 | Ex. 23 |
| --- | --- | --- | --- | --- | --- | --- |
| Component (A) (parts by mass) | UV-3000B | — | — | — | — | — |
|  | UV-3700B | — | — | — | — | — |
|  | UV-7000B | 20 | 20 | 20 | 20 | 20 |
|  | 1.6-HX-A | — | — | — | — | — |
|  | R-684 | 15 | 15 | 15 | 15 | 15 |
| Component (B) (parts by mass) | M-101A | 25 | 25 | 25 | 25 | 25 |
|  | QM | — | — | — | — | — |
|  | BZ | — | — | — | — | — |
|  | M-140 | 40 | 40 | 40 | 40 | 40 |
|  | EC-A | — | — | — | — | — |
|  | IBX | — | — | — | — | — |
| Component (C) photopolymerization initiator (parts by mass) | BDK | 3 | 3 | 3 | 3 | 3 |
|  | I-907 | — | — | — | — | — |
| Other components (parts by mass) | 2-HEMA | — | — | — | — | — |
|  | N-vinyl-pyrrolidone | — | — | — | — | — |
| Polymerization inhibitor | MDP | 0.1 | 0.1 | 0.1 | 0.1 | 0.1 |
| Component (D): granular material insoluble in (A), (B) and (C) (composition) |  | ***) | ***) | ***) | ***) | ***) |
| Component (D): granular material insoluble in (A), (B) and (C) (parts by mass) |  | 0.2 | 2 | 4 | 6 | 10 |
| Specific gravity of component (D): granular material insoluble in (A), (B) and (C) |  | 1.05 | 1.05 | 1.05 | 1.05 | 10.5 |
| Shape of component (D): granular material insoluble in (A), (B) and (C) |  | Spherical | Spherical | Spherical | Spherical | Spherical |
| Average particle size (μm) of component (D): granular material insoluble in (A), (B) and (C) |  | 60 | 60 | 60 | 60 | 60 |
| Standard deviation of particle size of component (D): granular material insoluble in (A), (B) and (C) |  | 0.086 | 0.086 | 0.086 | 0.086 | 0.086 |
| Glass transition temperature (° C.) |  | 34 | 34.9 | 34.9 | 36.7 | 37.2 |
| Bond strength (MPa) | — | 13.2 | 11.8 | 10.9 | 9.5 | 10.1 |
| Specific gravity of liquid |  | 1.11 | 1.11 | 1.11 | 1.11 | 1.11 |

TABLE 4-continued

|  |  | Ex. | | | | |
| --- | --- | --- | --- | --- | --- | --- |
|  |  | 19 | 20 | 21 | 22 | 23 |
| Time for removal in warm water at 80° C. (min. sec.) | — | 45 min | 40 min | 30 min | 20 min | 15 min |
| Removal state*)**) | — | Film form | Film form | Film form | Film form | Film form |

*)Film form: The cured adhesive composition was removed in the form of a film from the glass surface with no adhesive residue.
**)Adhesive residue: The glass was removed, but the cured adhesive composition remained on the glass surface.
***)Crosslinked polystyrene particles

Example 15

A resin composition was prepared in the same manner as in Example 1 except that as the granular material (D), spherical crosslinked polystyrene particles with an average particle size of 58 μm, a standard deviation of the particle volume distribution relative to the particle size when the particle size (μm) is represented by logarithm of 0.078 and a specific gravity of 1.05 (prepared by subjecting "SGP-150C" manufactured by Soken Chemical & Engineering Co., Ltd. to screening with a sieve with an opening of 63 μm and a sieve with an opening of 53 μm) were used and that materials as identified in Table 3 were used in a composition as identified in Table 3. With respect to the obtained composition, the same measurements as in Example 1 were carried out. The results are shown in Table 3.

Example 16

A resin composition was prepared in the same manner as in Example 1 except that as the granular material (D), spherical crosslinked polymethyl methacrylate particles with an average particle size of 140 μm, a standard deviation of the particle volume distribution relative to the particle size when the particle size (μm) is represented by logarithm of 0.074 and a specific gravity of 1.14 (prepared by subjecting "GM-5003" manufactured by GANZ CHEMICAL CO., LTD. to screening with a sieve with an opening of 150 μm and a sieve with an opening of 125 μm) were used and that materials as identified in Table 3 were used in a composition as identified in Table 3. With respect to the obtained composition, the same measurements as in Example 1 were carried out. The results are shown in Table 3.

Example 17

A resin composition was prepared in the same manner as in Example 1 except that as the granular material (D), spherical crosslinked polymethyl methacrylate particles with an average particle size of 70 μm, a standard deviation of the particle volume distribution relative to the particle size when the particle size (μm) is represented by logarithm of 0.073 and a specific gravity of 1.14 (prepared by subjecting "GM-5003" manufactured by GANZ CHEMICAL CO., LTD. to screening with a sieve with an opening of 75 μm and a sieve with an opening of 63 μm) were used and that materials as identified in Table 3 were used in a composition as identified in Table 3. With respect to the obtained composition, the same measurements as in Example 1 were carried out. The results are shown in Table 3.

Example 18

A resin composition was prepared in the same manner as in Example 1 except that as the granular material (D), spherical crosslinked polymethyl methacrylate particles with an average particle size of 40 μm, a standard deviation of the particle volume distribution relative to the particle size when the particle size (μm) is represented by logarithm of 0.071 and a specific gravity of 1.14 (prepared by subjecting "GM-5003" manufactured by GANZ CHEMICAL CO., LTD. to screening with a sieve with an opening of 45 μm and a sieve with an opening of 38 μm) were used and that materials as identified in Table 3 were used in a composition as identified in Table 3. With respect to the obtained composition, the same measurements as in Example 1 were carried out. The results are shown in Table 3.

Examples 24 to 28

Resin compositions were prepared in the same manner as in Example 1 except that no granular material (D) was used. With respect to the obtained resin compositions, the same measurements as in Example 1 were carried out. The results are shown in Table 5.

TABLE 5

|  |  | Ex. | | | | |
| --- | --- | --- | --- | --- | --- | --- |
|  |  | 24 | 25 | 26 | 27 | 28 |
| Component (A) (parts by mass) | UV-3000B | 30 | 20 | — | — | — |
|  | UV-3700B | — | — | — | 20 | — |
|  | UV-7000B | — | — | 20 | — | 20 |
|  | 1.6-HX-A | — | 10 | 10 | 10 | — |
|  | R-684 | 15 | — | — | — | 15 |
| Component (B) (parts by mass) | M-101A | 36 | 30 | 26 | 30 | 25 |
|  | QM | — | — | — | — | — |
|  | BZ | — | — | — | — | — |
|  | M-140 | 20 | 40 | 45 | 40 | 40 |
|  | EC-A | — | — | — | — | — |
|  | IBX | — | — | — | — | — |

TABLE 5-continued

|  |  | Ex. | | | | |
| --- | --- | --- | --- | --- | --- | --- |
|  | — | 24 | 25 | 26 | 27 | 28 |
| Component (C) photopolymerization initiator (parts by mass) | BDK | 5 | 5 | 3 | 3 | 3 |
|  | I-907 | — | — | — | — | — |
| Other components (parts by mass) | 2-HEMA | — | — | — | — | — |
|  | N-vinyl-pyrrolidone | — | — | — | — | — |
| Polymerization inhibitor | MDP | — | — | — | — | — |
| Component (D): granular material insoluble in (A), (B) and (C) (composition) |  | — | — | — | — | — |
| Component (D): granular material insoluble in (A), (B) and (C) (parts by mass) |  | — | — | — | — | — |
| Specific gravity of component (D): granular material insoluble in (A), (B) and (C) |  | — | — | — | — | — |
| Shape of component (D): granular material insoluble in (A), (B) and (C) |  | — | — | — | — | — |
| Average particle size (μm) of component (D): granular material insoluble in (A), (B) and (C) |  | — | — | — | — | — |
| Standard deviation of particle size of component (D): granular material insoluble in (A), (B) and (C) |  | — | — | — | — | — |
| Glass transition temperature (° C.) |  | 7.2 | 12 | 20 | 11.9 | 35 |
| Bond strength (MPa) | — | 10.8 | 12 | 13.2 | 11.9 | 12.8 |
| Specific gravity of liquid |  | 1.16 | 1.16 | 1.11 | 1.13 | 1.11 |
| Time for removal in warm water at 80° C. (min. sec.) |  | 30 min | 20 min | 25 min | 60 min | 150 min |
| Removal state*)**) | — | Film form | Film form | Film form | Film form | Film form |

*)Film form: The cured adhesive composition was removed in the form of a film from the glass surface with no adhesive residue.
**)Adhesive residue: The glass was removed, but the cured adhesive composition remained on the glass surface.
MATERIALS USED
BDK: Benzyl dimethyl ketal ("IRGACURE 651", manufactured by Ciba Specialty Chemicals)
UV-3700B: Polyether urethane acrylate ("UV-3700B" manufactured by Nippon Synthetic Chemical Industry Co., Ltd.)
UV-7000B: Polyether urethane acrylate ("UV-7000B" manufactured by Nippon Synthetic Chemical Industry Co., Ltd.)
1.6-HX-A: 1,6-hexanediol diacrylate ("LIGHT-ACRYLATE 1.6-HX-A" manufactured by KYOEISHA CHEMICAL CO., LTD.)
EC-A: Ethoxydiethylene glycol diacrylate ("LIGHT-ACRYLATE EC-A" manufactured by KYOEISHA CHEMICAL CO., LTD.)
QM: Dicyclopentenyloxyethyl methacrylate ("QM-657" manufactured by Rohm & Haas)
BZ: Benzyl methacrylate ("LIGHT-ESTER BZ" manufactured by KYOEISHA CHEMICAL CO., LTD.)
IBX: Benzyl methacrylate ("LIGHT-ESTER IB-X" manufactured by KYOEISHA CHEMICAL CO., LTD.)
2-HEMA: 2-Hydroxyethyl methacrylate
N-vinylpyrrolidone: N-vinylpyrrolidone (manufactured by NIPPON SHOKUBAI CO., LTD.)

Examples 29 and 30

Using the curable compositions in Examples 2 and 5, removing test pieces were prepared in the same manner as in Example 1, and the removing tests were carried out by changing the temperature of warm water to 40° C., 50° C., 60° C. and 70° C. The results are shown in Table 6. The results show removability at any temperature.

TABLE 6

| Resin composition | | | Temperature of warm water (° C.) | | | |
| --- | --- | --- | --- | --- | --- | --- |
| No. | | | 40 | 50 | 60 | 70 |
| Ex. 29 | Example 2 | Removal time (min) | 60 | 30 | 4 | 2 |
| Ex. 30 | Example 5 | Removal time (min) | 35 | 15 | 2 | 1 |

Example 31

Heat resistant Pyrex glass in the form of a sheet of 150 mm×150 mm×2 mm in thickness and the blue sheet glass used in Example 1 (as dummy glass) were bonded by the resin composition in Example 2 and the composition was cured in the same manner as in Example 1. Only the heat resistant Pyrex glass portion of the adhesive test piece was cut in the size of 10 mm square by means of a dicing apparatus. No dropping of the heat resistant Pyrex glass occurred during cutting, thus showing good proccessability. The adhesive test piece having only the heat resistant Pyrex glass portion cut was immersed in warm water at 80° C., whereby the entire adhesive was removed in 60 minutes. In addition, ten cut test pieces after the removal were arbitrarily selected and taken, and the back side (the side temporarily fixed with the resin composition) of each cut test piece was observed with an optical microscope, to measure the maximum width of the chipped portions of glass, and to calculate the average value and the standard deviation thereof. The results are shown in Table 7.

Comparative Example 5

Heat resistant Pyrex glass of 150 mm×150 mm×2 mm and the blue sheet glass used in Example 1 were bonded by molten hot-melt type adhesive ("ADFIX A" manufactured by NIKKA SEIKO CO., LTD.) heated at 90° C. Only the heat resistant Pyrex glass portion of the adhesive test piece was cut in the size of 10 mm square by means of a dicing apparatus. No dropping of the heat resistant Pyrex glass occurred during cutting, thus showing good proccessability. The test piece was immersed in a N-methylpyrrolidone solution for one day, resulting cut test pieces were recovered, ten cut test pieces after the removal were optionally taken in the same manner as in Example 26, and the back side (the side temporarily fixed with the hot-melt type adhesive) of each cut test piece was observed with an optical microscope, to measure the maximum width of the chipped portions of glass, and to calculate the average value and the standard deviation thereof. The results are shown in Table 6.

Comparative Example 6

Heat resistant Pyrex glass of 150 mm×150 mm×2 mm was bonded by means of a UV-curable PET adhesive tape. Only the heat resistant Pyrex glass portion of the adhesive test piece was cut in the size of 10 mm square by means of a dicing apparatus. The adhesive tape portion of the test piece was irradiated with ultraviolet rays to decrease the adhesive force, and then cut test piece was recovered. Ten cut test pieces after the removal were optionally taken in the same manner as in Example 26, and the back side (the side temporarily fixed with the adhesive tape) of each cut test piece was observed with an optical microscope, to measure the maximum width of the chipped portions of glass, and to calculate the average value and the standard deviation thereof. The results are shown in Table 6.

It is shown from Table 6 that the temporary fixation method of the present invention is excellent particularly in view of prevention of chipping at the time of processing components.

TABLE 7

| | Maximum widths of chipped portions on the back side of ten cut test pieces (μm) | | | | | | | | | | | Standard |
| | Cut test piece No. | | | | | | | | | | | |
| | 1 | 2 | 3 | 4 | 5 | 6 | 7 | 8 | 9 | 10 | Average | deviation |
|---|---|---|---|---|---|---|---|---|---|---|---|---|
| Ex. 31 | 51 | 46 | 45 | 43 | 54 | 66 | 48 | 55 | 53 | 53 | 51.4 | 6.2 |
| Comp. Ex. 5 | 41 | 55 | 80 | 110 | 28 | 77 | 55 | 60 | 77 | 65 | 64.8 | 21.7 |
| Comp. Ex. 6 | 90 | 101 | 88 | 101 | 88 | 77 | 65 | 95 | 101 | 141 | 94.7 | 18.9 |

INDUSTRIAL APPLICABILITY

The adhesive composition of the present invention has a photocurable property by virtue of its composition and is curable with visible light or ultraviolet rays, and the cured resin thereof shows a high adhesive strength without being affected by cutting water or the like, and thus the effects of inducing little displacement during processing of a member and readily obtaining a member excellent in dimensional accuracy are achieved. Furthermore, it loses the adhesive strength when contacted with warm water, whereby the bonding strength between members or between a member and a jig, will be reduced so that the member can be readily removed. Therefore, it is industrially useful as an adhesive for temporary fixation of optical lenses, prisms, arrays, silicon wafers, semiconductor packaging parts, and so on.

The method for temporarily fixing a member of the present invention uses the above-mentioned characteristic adhesive composition, whereby it is unnecessary to use an organic solvent, which used to be needed in the conventional technologies, and it is excellent in the working efficiency since the cured resin can be recovered in the form of a film from the member, and is thereby industrially very useful The entire disclosures of Japanese Patent Application No. 2006-218416 filed on Aug. 10, 2006 including the specification, claims and summary are incorporated herein by reference in their entireties.

The invention claimed is:

1. A method for temporarily fixing a member, which comprises:
    bonding and temporarily fixing the member by means of the adhesive composition comprising (A) a polyfunctional (meth)acrylate, (B) a monofunctional (meth)acrylate and (C) a photopolymerization initiator, wherein the glass transition temperature of a cured resin obtained from the adhesive composition is from −50° C. to 40° C.,
    processing the temporarily fixed member, and
    immersing the processed member in warm water of at most 90° C., thereby to remove a cured resin of the adhesive composition from the member.

2. The method according to claim 1, wherein both (A) and (B) are hydrophobic.

3. The method according to claim 1, which contains (A) and (B) in a ratio of (A):(B) of 5:95 to 95:5 (parts by mass) and contains (C) in an amount of from 0.1 to 20 parts by mass per 100 parts by mass of the total amount of (A) and (B).

4. The method according to claim 1, which contains (D) a granular material which is insoluble in any of (A), (B) and (C) in an amount of from 0.1 to 20 parts by mass per 100 parts by mass of the total amount of (A) and (B).

5. The method according to claim 4, wherein the specific gravity of (D) is equal to or smaller than the specific gravity of the adhesive composition.

6. The method according to claim 4, wherein (D) is spherical.

7. The method according to claim 4, wherein (D) is any one of crosslinked polymethyl methacrylate particles, crosslinked polystyrene particles and crosslinked polymethyl methacrylate/polystyrene copolymer particles, or a mixture of some or all of them.

8. The method according to claim 4, wherein the average particle size of (D) by a laser method is from 20 to 200 μm.

9. The method according to claim 4, wherein the standard deviation of the particle volume distribution relative to the particle size when the particle size (μm) of (D) by a laser method is represented by logarithm, is within a range of from 0.0001 to 0.25.

* * * * *